(12) United States Patent
Basir et al.

(10) Patent No.: US 6,889,215 B2
(45) Date of Patent: May 3, 2005

(54) INTELLIGENT AIR BAG SYSTEM

(75) Inventors: Otman Basir, Kitchener (CA); Fakhri Karray, Waterloo (CA)

(73) Assignee: Intelligent Mechatronic Systems Inc. (CA)

( * ) Notice: Subject to any disclaimer, the term of this patent is extended or adjusted under 35 U.S.C. 154(b) by 327 days.

(21) Appl. No.: 09/858,676

(22) Filed: May 16, 2001

(65) Prior Publication Data

US 2001/0047344 A1 Nov. 29, 2001

Related U.S. Application Data

(63) Continuation-in-part of application No. PCT/IB00/01560, filed on Oct. 27, 2000.
(60) Provisional application No. 60/162,414, filed on Oct. 27, 1999.

(51) Int. Cl.⁷ .............................................. G06F 151/18
(52) U.S. Cl. .............................. 706/14; 706/52; 706/12
(58) Field of Search .............................. 706/52, 12, 14

(56) References Cited

U.S. PATENT DOCUMENTS

| | | | |
|---|---|---|---|
| 5,742,916 A | * | 4/1998 | Bischoff et al. ............... 701/45 |
| 5,821,633 A | | 10/1998 | Burke et al. |
| 5,848,661 A | * | 12/1998 | Fu ............................... 180/273 |
| 5,901,978 A | | 5/1999 | Breed et al. |
| 5,916,290 A | | 6/1999 | Kiribayashi |

FOREIGN PATENT DOCUMENTS

| | | |
|---|---|---|
| DE | 197 53 163 A1 | 11/1997 |
| WO | WO 01/30612 A1 | 5/2001 |

OTHER PUBLICATIONS

XP–002137509; Section 5—Occupant Protection Advanced Technology.

* cited by examiner

*Primary Examiner*—Anthony Knight
*Assistant Examiner*—Joseph P. Hirl
(74) *Attorney, Agent, or Firm*—Carlson, Gaskey & Olds

(57) ABSTRACT

An intelligent air bag system includes a controller communicating with a sensor suite and the air bag. The controller preferably includes a fuzzy inference engine. The sensor suite includes a plurality of sensors such as weight sensors, acceleration sensors, seat belt activation sensors, and the like. The fuzzy inference engine determines deployment by using a rule base including a multiple of parameters. The decision to deploy the air bag and the strength of the air bag deployment is determined by controller using fuzzy logic to more particularly tailor deployment to present conditions.

26 Claims, 3 Drawing Sheets

FUZZY CONTROLLER

INTELLIGENT AIR BAG SYSTEM

BACKGROUND OF THE INVENTION

The present application is a Continuation in Part of PCT Application Number PCT/IB00/01560 filed Oct. 27, 2000, which claims priority to U.S. Provisional Patent Application Ser. No. 60/162,414, filed Oct. 27, 1999.

The present invention relates generally to techniques for processing air bag activation signals, and more specifically to the utilization of fuzzy logic during the air bag deployment determination.

Air bag systems are commonly used in vehicle applications to provide protection for the vehicle operator and/or passenger in the event of a vehicular collision. Typical technique for implementing an air bag system includes detecting vehicular acceleration via an accelerometer and then evaluating the resulting acceleration signal to determine whether an impact of sufficient severity has occurred to require the air bag to deploy.

Most acceleration-based air bag systems utilize a microprocessor to evaluate the acceleration signal. As is known in the art, such microprocessor use permits evaluation algorithms to be easily implemented in software. The deployment determination in known systems is based on conventional logic operations.

However, because the deployment determination is typically rigidly implemented by using conventional logic operations, certain deployment determinations may not be optimized. In addition, modeling all the parameters of the very complex processes of selectively firing an air bag cannot encompass all possible variables to provide for the optimal ruing of an air bag.

Accordingly, it is desirable to provide an intelligent airbag controller which will provide a deployment determination based in part on partial truths or fuzzy logic determinations to more particularly tailor deployment.

SUMMARY OF THE INVENTION

The intelligent air bag system according to the present invention includes a controller communicating with a sensor suite and the air bag. The controller preferably includes logic functions based in part on "fuzzy" logic algorithms. The sensor suite preferably includes a plurality of sensors such as weight sensors, acceleration sensors, seat belt activation sensors, and the like. It should be understood that other sensors will benefit from the present invention, as fuzzy logic is particularly applicable to large rule sets receiving information from many sources. Other predefined constants are preferably maintained in a database in communication with the controller. The database includes such constants as, for example, vehicle type, passenger size, and passenger weight.

The fuzzy inference engine is implemented using a multiple of parameters, a rule base including the predefined parameters is developed. The decision to deploy the air bag and the strength of the air bag deployment is determined by structuring the parameters within the rule base for operation by the fuzzy inference engine.

Accordingly, an intelligent airbag controller provides a deployment determination based in part on fuzzy logic determinations to more particularly tailor deployment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
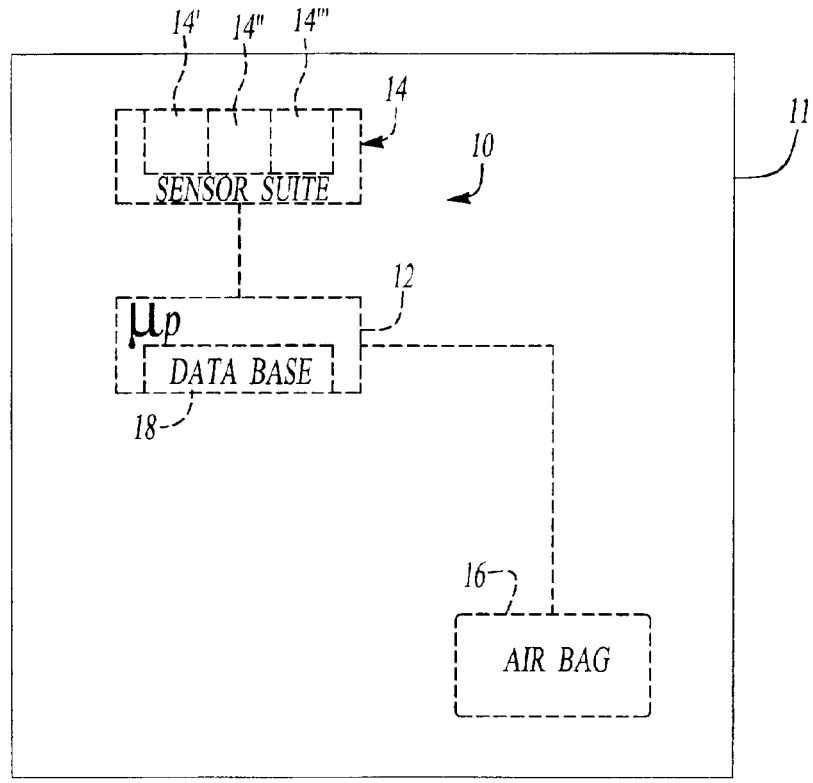
FIG. 1 is a schematic view of an air bag system according to the present invention.

FIG. 1 schematically illustrates an intelligent air bag system 10 for a vehicle 11. The system 10 generally includes a fuzzy controller 12 communicating with a sensor suite 14 and the air bag 16. The fuzzy controller 12 provides logic functions based in part on "fuzzy" logic algorithms as will be further described below. The sensor suite 14 includes a plurality of sensors such as weight sensors 14', acceleration sensors 14", a seat belt activation sensor 14''', and the like. It should be understood that other sensors will benefit from the present invention as fuzzy logic is particularly applicable to large rule sets receiving information from many sources. Moreover, other predefined constants are preferably maintained in database 18 in communication with the controller 12. The database 18 includes such constants as, for example, vehicle type size, weight, vehicle frame type, among others.

As is known, Fuzzy Logic is basically a multivalued logic that allows intermediate values to be defined between conventional evaluations like yes/no, true/false, fast/slow, etc. Notions like rather hard or pretty mild are formulated mathematically and processed by computers. In this way an attempt is made to apply a more human-like way of thinking in the programming of computers. The present invention preferably implements air bag actuation once a critical set of conditions are met under a number of combinations. The parameters which are involved in the decision to fire the air bag 16 includes such factors as the weight of the passenger; the size of the passenger; the severity of the collision; type of vehicle; and whether the occupant is wearing a seat belt.

Figure 2:
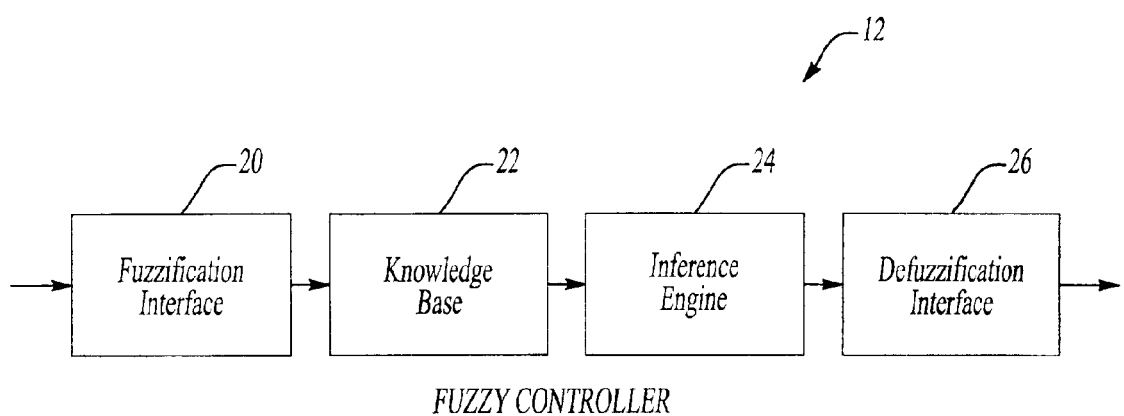
FIG. 2 is a schematic block diagram illustrating a fuzzy controller for an air bag system according to the present invention.

Referring to FIG. 2, the fuzzy controller 12 is schematically illustrated. The fuzzy controller 12 preferably includes a fuzzification interface or fuzzifier 20, a knowledge base 22, an inference engine 24 and a deffuzfication interface 26. As the sensors 14 (FIG. 1) provide crisp measurements and the actuators require crisp inputs, there are two additional considerations when linguistic descriptions are employed for control purposes: fuzzifying the input of the controller and defuzzifying its output.

The fuzzifier 20 is defined as a mapping from a real-valued point $x \in X \subset R^n$ to a fuzzy set. The role of the fuzzification interface 20 involves measuring the values of the input variables and performing a scale mapping that transfers the range of values of input variables into corresponding universe of discourse X where X consists of n elements. Also, this interface performs the function of fuzzification that converts input data into suitable linguistic values, which may be viewed as labels of fuzzy sets.

The knowledge base 22 includes the knowledge of the application domain and the control goals. It consists of a "data base" and a "linguistic (fuzzy) control rule base". The database provides some sort of process description which is used to define linguistic control rules and fuzzy data manipulation in FLC. The rule base characterizes the control goals and control policy of the domain experts by means of a set of linguistic control rules.

The decision-making logic is the kernel of FLC. The inference engine 24 has the capability of simulating human decision-making, based on fuzzy concepts and inferring fuzzy control actions that use fuzzy implications and rules of inference. Fuzzy inference systems as a computational framework rely on the principles of fuzzy set theory and fuzzy approximate reasoning.

The defuzzification interface 26 performs scale mapping, which converts the range of values of output variables into corresponding universes of discourse; and defuzzification, which yields a non-fuzzy control action from an inferred fuzzy control action.

Several defuzzification techniques have been suggested over the years. The appropriate choice of a defuzzification method can lead to a significant improvement in terms of speed and accuracy of a given fuzzy controller. The most frequently used methods are the centroid or center of area (COA) method, the center of sums (COS) method, and the mean of maxima (MOM) method.

To deploy the airbag 16, the system 10 identifies forces acting in the same plane as that airbag's deployment. In simpler terms, this means that a side airbag is not deployed for a front impact nor do we deploy the front airbag for a side impact. If the impact comes from an angle in between, such as the front corner of the vehicle, the X and Y components of the impact are decided independently.

Each airbag in the vehicle is operated as an independent system. In other words, although two airbags may share some of the same inputs, they will not share the same fuzzy engine and they will deploy independently of one another. This makes the system more modular and allows the system 10 to be tailored to any vehicle regardless of the number of occupants or the number of airbags per occupant.

The inference engine 24 preferably remains dormant until a crash is detected. Once a crash has been detected, the inference engine 24 is notified. It then receives inputs from the sensor suite 14, processes them and produces as output, a signal to the deployment to deploy and a certain level.

Figure 3:
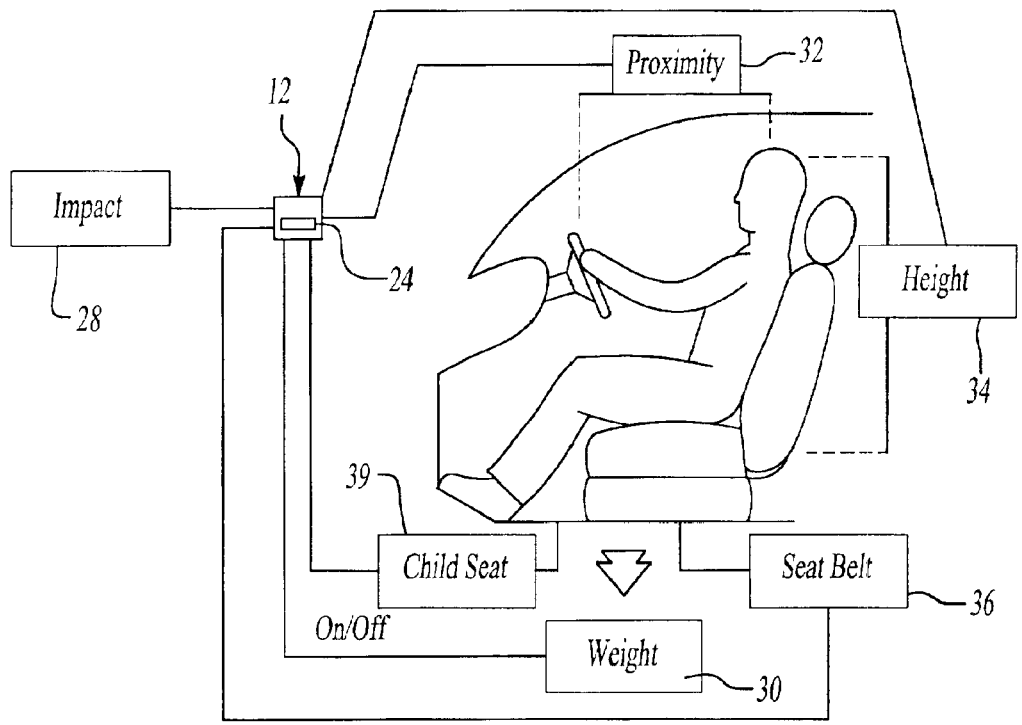
FIG. 3 is a general schematic perspective view of an air bag system according to the present invention.

Referring to FIG. 3, the sensory suite 14 preferably provides the inference engine 24 with five crisp inputs. These include the intensity of the impact 28, the weight of the occupant 30, the occupant's proximity to the airbag 32, the occupant's upper body height 34, and whether or not the occupant is wearing a seatbelt 36. In addition, a child seat switch 39 is also provided which identifies whether the child seat is installed.

Figure 4:
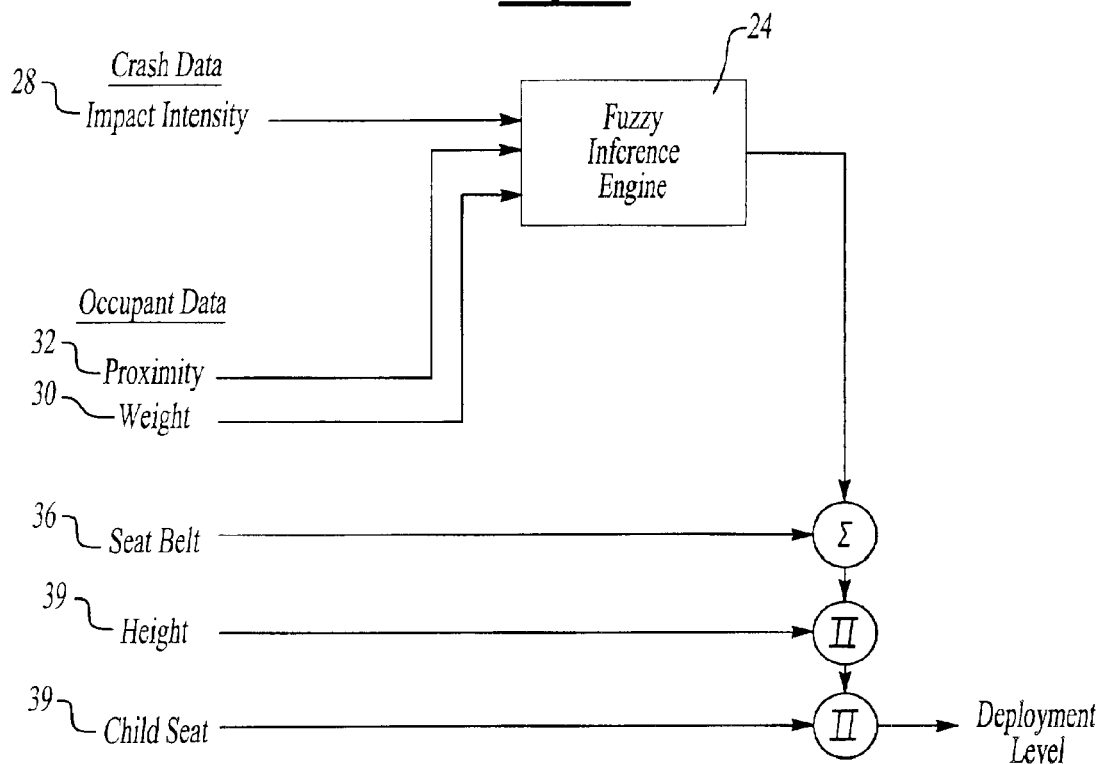
FIG. 4 is a schematic block diagram illustrating a fuzzy controller for an air bag system according to the present invention.

Referring to FIG. 4, the inference engine 24 evaluates three inputs: the force of impact (as felt by the occupant) 28, the weight of the occupant 30 and the occupant's proximity to the airbag at the time of deployment 32. A bias is added depending on whether or not the occupant is wearing a seatbelt 36. The final deployment level is then scaled for the height of the occupant 34. Each one of the three main sensory inputs then gets fuzzified into a one or several fuzzy input(s).

Figure 5:
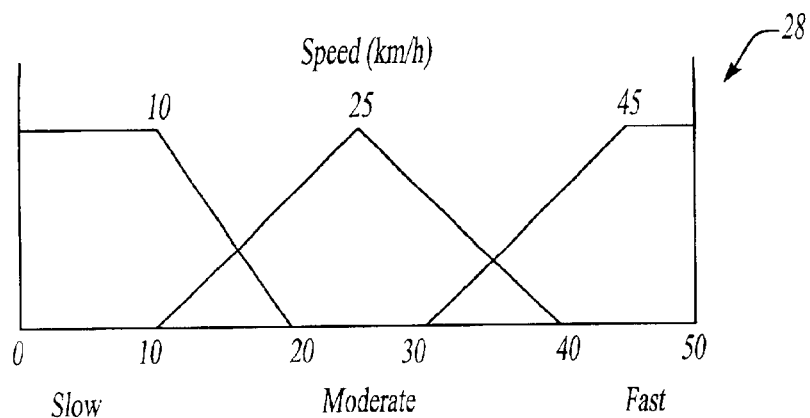
FIG. 5 is one graph illustrating input determinations to the Fuzzy inference engine of FIG. 4.

Referring to FIG. 5, there are preferably three membership functions for the speed input 28. These are denoted as SLOW, MODERATE and FAST. The impact membership functions are modeled using a pair of trapezoidal functions (SLOW and FAST) and a triangular function (MODERATE). The SLOW state has been defined as any value less than 20 km/h. The MODERATE state has been defined as any value between 10 and 40 km/h. The FAST state has been defined as any value greater than 30 km/h.

Figure 6:
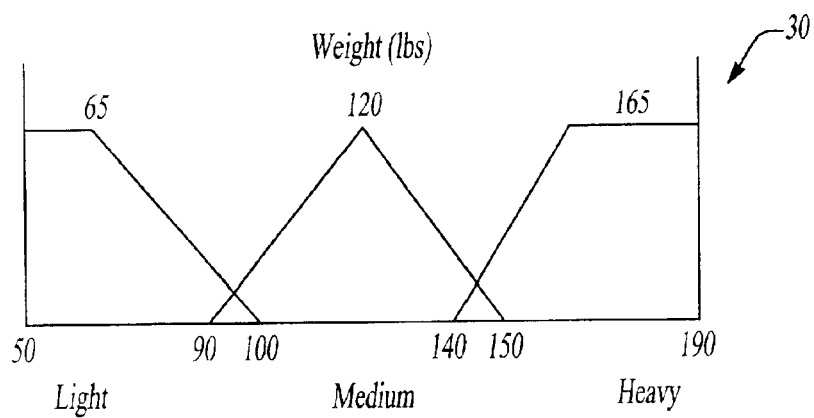
FIG. 6 is another graph illustrating input determinations to the Fuzzy inference engine of Figure.

Referring to FIG. 6, there are preferably three membership functions for the weight input 30. These are denoted as LIGHT, MEDIUM and HEAVY. The Weight membership functions are modeled using a pair of trapezoidal functions (LIGHT and HEAVY) and a triangular function (MEDIUM). The LIGHT state has been defined as any value less than 100 lbs. The MEDIUM state has been defined as any value between 90 and 150 lbs. The HEAVY state has been defined as any value greater that 140 lbs.

Figure 7:
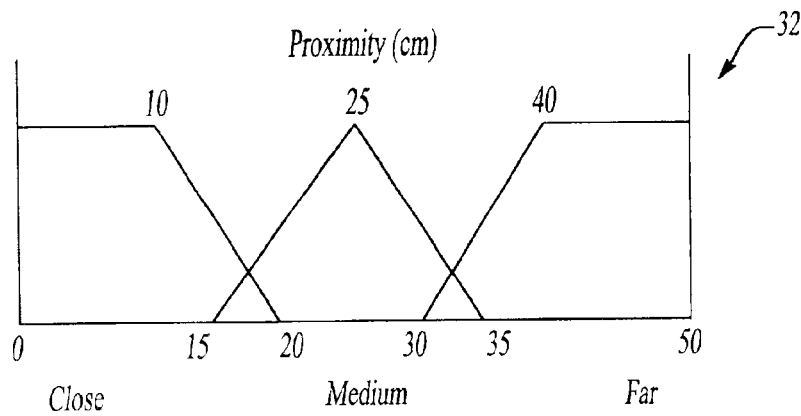
FIG. 7 is another graph illustrating input determinations to the Fuzzy inference engine of FIG. 4.

Referring to FIG. 7, there are preferably three membership functions for the proximity input 32. These are denoted as CLOSE, MEDIUM and FAR. The Proximity membership functions have been modeled using a pair of trapezoidal functions (CLOSE and FAR) and a triangular function (MEDIUM). The CLOSE state has been defined as any value less than 20 cm. The MEDIUM state has been defined as any value between 15 and 35 cm. The FAR state has been defined as any value greater that 30 cm.

Once the crisp inputs have been fuzzified by the fuzzification interface (FIG. 2) 20 they are ready to be evaluated by the inference engine 24. The impact intensity 28, the weight 30 and the proximity 32 are sent to the fuzzy engine 24 where they are processed.

Preferably, there are four membership functions for the fuzzy engine output. These are denoted by NONE, WEAK, MEDIUM, STRONG. The NONE state has been defined as 0% deployment. The WEAK state has been defined as 24% deployment. The MEDUIM state has been defined as 48% deployment. The STRONG state has been defined as 72% deployment.

There are preferably nine rules for NO deployment:
IF impact=low AND proximity=close AND weight=light, THEN output=none
IF impact=low AND proximity=close AND weight=medium, THEN output=none
IF impact=low AND proximity=close AND weight=heavy, THEN output=none
IF impact=low AND proximity=medium AND weight=light, THEN output=none
IF impact=low AND proximity=medium AND weight=medium, THEN output=none
IF impact=low AND proximity=medium AND weight=heavy, THEN output=none
IF impact=low AND proximity=far AND weight=light, THEN output=none
IF impact=low AND proximity=far AND weight=medium, THEN output=none
IF impact=low AND proximity=far AND weight=heavy, THEN output=none There are preferably six rules for WEAK deployment:
IF impact=medium AND proximity=close AND weight=light, THEN output=weak
IF impact=medium AND proximity=close AND weight=medium, THEN output=weak
IF impact=medium AND proximity=close AND weight=heavy, THEN output=weak IF impact=medium AND proximity=medium AND weight=light, THEN output=weak IF impact=medium AND proximity=medium AND weight=medium, THEN output=weak IF impact=medium AND proximity=far AND weight=light, THEN output=weak There are preferably seven rules for MEDIUM deployment.

IF impact=medium AND proximity=medium AND weight=heavy, THEN output=medium

IF impact=medium AND proximity=far AND weight=medium, THEN output=medium

IF impact=medium AND proximity=far AND weight=heavy, THEN output=medium

IF impact=high AND proximity=close AND weight=light, THEN output=medium

IF impact=high AND proximity=close AND weight=medium, THEN output=medium

IF impact=high AND proximity=close AND weight=heavy, THEN output=medium

IF impact=high AND proximity=medium AND weight=light, THEN output=medium

There are preferably five rules for STRONG deployment:

IF impact=high AND proximity=medium AND weight=medium, THEN output=strong

IF impact=high AND proximity=medium AND weight=heavy, THEN output=strong

IF impact=high AND proximity=far AND weight=light, THEN output=strong

IF impact=high AND proximity=far AND weight=medium, THEN output=strong

IF impact=high AND proximity=far AND weight=heavy, THEN output=strong

The height 34 and seatbelt 36 functions are used to bias the output of the main fuzzy engine output after defuzzification (FIG. 4). The seatbelt bias is added to the fuzzy output if the occupant is wearing a seatbelt. This total is then multiplied by the height bias in order to scale the final output to the height of the occupant. These biases are preferably applied as such:

Add 0, if seatbelt is off, or 10% of the fuzzy engine output, if the seatbelt is on, to the fuzzy deployment. Multiply this sum by the height bias to produce the final output. This value is 0.75, if the occupant has a torso height of less than 64 cm and 1.25 if the occupant has a torso height of more than 64 cm.

Finally if a child has been sensed on the seat, the inference engine will automatically generate a zero deployment level.

It should be understood that in addition or alternatively, other parameters and additional rules can be defined for the fuzzy inference engine 24 to more fully define the decision and the strength of the air bag deployment to provide an optimal response. By implementing air bag deployment using fuzzy logic, the strength of the air bag deployment is particularly tailored to the conditions. Exemplary illustrations of the present invention are as follows:

CASE 1: Child Seat
 0% deployment in all cases.
CASE 2: Small Woman
 Height (torso+head): 60 cm
 Weight: 90 lbs.

| | | % Deployment | |
| --- | --- | --- | --- |
| | Proximity (cm) | Speed of 15 km/h | Speed of 45 km/h |
| Seatbelt | 10 | 10 | 40 |
| No Seatbelt | 10 | 10 | 40 |
| Seatbelt | 30 | 10 | 40 |
| No Seatbelt | 30 | 10 | 40 |

CASE 3: Large woman
 Height (torso+head): 70 cm
 Weight: 160 lbs.

| | | % Deployment | |
| --- | --- | --- | --- |
| | Proximity (cm) | Speed of 15 km/h | Speed of 45 km/h |
| Seatbelt | 10 | 10 | 70 |
| No Seatbelt | 10 | 10 | 60 |
| Seatbelt | 30 | 30 | 100 |
| No Seatbelt | 30 | 20 | 90 |

CASE 4: Man
 Height (torso+head): 95 cm
 Weight: 200 lbs.

| | | % Deployment | |
| --- | --- | --- | --- |
| | Proximity (cm) | Speed of 15 km/h | Speed of 45 km/h |
| Seatbelt | 10 | 10 | 70 |
| No Seatbelt | 10 | 10 | 60 |
| Seatbelt | 30 | 30 | 100 |
| No Seatbelt | 30 | 20 | 90 |

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An occupant safety system comprising:
 a controller including a fuzzy inference engine responding to a rule base;
 a sensor suite communicating with said controller; and
 said controller operable to activate an active restraint at one of a plurality of levels of deployment based upon said sensor suite and said rule base.

2. The system as recited in claim 1, wherein said sensor suite includes a weight sensor.

3. The system as recited in claim 1, wherein said sensor suite includes a seat belt activation sensor.

4. The system as recited in claim 1, further comprising a database in communication with said controller.

5. The system of claim 1 wherein the controller chooses among a zero deployment and a plurality of active levels of deployment for an active restraint, wherein the deployment instructions indicate the zero deployment or one of the active levels of deployment.

6. The system of claim 1 wherein the controller includes a fuzzy engine output including a zero deployment membership function and a plurality of deployment membership functions.

7. The system of claim 6 wherein the controller scales the fuzzy engine output based upon occupant information.

8. The system of claim 7 wherein the occupant information includes at least one of seat belt usage or occupant height.

9. A method of activating an active restraint comprising the steps of:
   (1) defining a rule base relating a multiple of active restraint deployment parameters and conditions;
   (2) communicating inputs from a sensor suite to a controller operating upon the rule base; and
   (3) determining a level of force with which to deploy the active restraint in response to the rule base and said inputs.

10. A method as recited in claim 9, wherein said step (3) is based in part upon whether a seat belt is fastened.

11. A method as recited in claim 9, wherein said step (3) is based in part upon vehicle type.

12. A method as recited in claim 9, wherein said step (3) is based in part upon passenger weight.

13. A method as recited in claim 9, wherein said step (3) is based in part upon classifying a severity of collision.

14. The method of claim 9 wherein said step (3) further includes the steps of:
   (4) determining whether to deploy the active restraint in response to the rule base and the inputs; and
   (5) determining the level of force with which to deploy the active restraint in response to the rule base and said inputs only if it is determined in said step (4) to deploy the active restraint.

15. The method of claim 9 wherein said step 3) further includes the step of choosing among a zero deployment and a plurality of levels of deployment far the active restraint, wherein the deployment instructions indicate the zero deployment or one of the levels of deployment.

16. The method of claim 9 wherein said step 3) further includes the step of using a fuzzy engine output including a zero deployment membership function and a plurality of deployment membership functions.

17. The method of claim 16 further including the step of scaling the fuzzy engine output based upon occupant information.

18. The method of claim 17 wherein the occupant information includes at least one of seat belt usage or occupant height.

19. A computer readable medium scoring a program which when executed by a computer performs the steps of:
   1) converting occupant and crash information inputs into fuzzy data;
   2) using the fuzzy data in a fuzzy logic controller to determine fuzzy control actions;
   3) converting the fuzzy control actions into deployment instructions, by defuzzifying the control actions; and
   4) sending the deployment instructions to an active restraint deployment controller.

20. The computer readable medium as recited in claim 19, wherein said fuzzy logic controller utilizes a rule base and inference engine to determine the control actions.

21. The computer readable medium an recited in claim 19, wherein said step 3) further comprises determining the strength of active restraint deployment.

22. The computer readable medium as recited in claim 19, wherein said step 3) further comprises using occupant height and seatbelt information to determine deployment instructions.

23. The computer readable medium of claim 19 wherein said step 3) further includes the step of choosing among a zero deployment and a plurality of levels of deployment For an active restraint, wherein the deployment instructions indicate the zero deployment or one of the levels of deployment.

24. The computer readable medium of claim 19 wherein the fuzzy logic controller includes a fuzzy engine output including a zero deployment membership function and a plurality of deployment membership functions.

25. The computer readable medium of claim 24 wherein the computer further performs the step of scaling the fuzzy engine output based upon occupant information.

26. The computer readable medium of claim 25 wherein the occupant information includes at least one of seat belt usage or occupant height.

* * * * *